United States Patent [19]

Hayashi

[11] Patent Number: 4,723,178
[45] Date of Patent: Feb. 2, 1988

[54] POWER PLATE HOLDING MECHANISM

[75] Inventor: Hideki Hayashi, Tokyo, Japan

[73] Assignee: Clarion Co., Ltd., Tokyo, Japan

[21] Appl. No.: 848,882

[22] Filed: Apr. 7, 1986

[30] Foreign Application Priority Data

Apr. 5, 1985 [JP] Japan .................................. 60-72265

[51] Int. Cl.$^4$ .............................................. G11B 5/54
[52] U.S. Cl. ................................................. 360/105
[58] Field of Search .................. 360/105; 242/197–200

[56] References Cited

U.S. PATENT DOCUMENTS

| 4,523,241 | 6/1985 | Ito | 360/105 |
| 4,656,552 | 8/1984 | Takahashi et al. | |
| 4,674,001 | 6/1987 | Takahashi | 360/137 |

Primary Examiner—A. J. Heinz
Attorney, Agent, or Firm—Flynn, Thiel, Boutell & Tanis

[57] ABSTRACT

A power plate holding mechanism for use in a tape player includes a pivotable power plate having a first arm which is formed with a pin contacting the outer margin of a cam of an intermittent gear and a second arm which is formed with a pin-shaped pull member. A shift plate has an elongated hole defining first and second edges for engagement with the pull member and has a hook-shaped engage portion for engagement with a lock pin moving in a guide hole formed in a chassis of the tape player, so that when the lock pin locks the shift plate, the immovable shift plate locks the power plate by engagement of the lock member and the first engagement edge.

5 Claims, 4 Drawing Figures

POWER PLATE HOLDING MECHANISM

FIELD OF THE INVENTION

This invention relates to a power plate holding mechanism in a tape player having a head movable back and forth with respect to a tape.

BACKGROUND OF THE INVENTION

A tape player in general takes different operational modes such as a play mode, fast-forwarding (FF) mode, rewinding (REW) mode, stop or pause mode, and loading/ejection mode. These modes require different positions of a head with respect to a tape. Therefore, such a head is supported on a head plate moved by a drive means in a direction perpendicular to the tape running direction so as to bring the head to and away from the tape.

An arrangement for driving the head plate is configured to convert rotation of a motor to a linear power by a cam intermittently rotated only when the head plate is to be driven, and uses the linear power to move the head plate.

FIG. 4 shows a prior art arrangement of a driving means of this type.

An intermittent gear 81 is mounted adjacent a drive gear 80 which is continuously rotated by a motor. The intermittent gear 81 has a cutout 82 partly breaking a series of circumferential gear teeth thereof and has a cam 83 integrally formed on one surface thereof. A linearly reciprocal power plate 84 is mounted adjacent the intermittent gear 81 and has a roller 85 contacting the outer margin of the cam 83. Therefore, with rotation of the intermittent gear 81, the power plate 84 is guided and linearly moved by the cam 83.

The power plate 84 has a pin-shaped pull member 86 engageable with an engage portion 88 formed on a shift plate 87 co-movable with the head plate. When the power plate 84 moves, the pull member 86 compressively engages the engage portion 88b and moves the shift plate 87 ahead (rightwardly) together with the head plate. The shift plate 87 is rotatable about a junction 89 joining it to the head plate. However, since a holding means not shown prevents the shift plate 87 from rotating during advance movement of the head plate, the pull member 86 applies a linear power to the engage portion 88.

When the shift plate 87 reaches its advance position and is locked by a lock means 90, the contact point of the cam 83 with respect to the roller 85 moves to a smaller radius portion, and the power plate 84 starts withdrawal. With a slight withdrawal of the power plate 84, the cutout 82 of the intermittent gear reaches the drive gear 80, and the intermittent gear 81 loses the driving energy. If the intermittent gear 81 is locked immovable there, the power plate 84 also stops, and the head plate completes its advance. Therefore, the power plate 84, when brought to this position, is locked there by a specifically provided lock member 91. This lock of the power plate 84 is effected at a position where the roller 85 stops at an angled portion slightly backward of the smallest radius portion of the cam 83.

In withdrawal of the head plate, the shift plate holding means is released by a plunger, for example, to detach the shift plate 87 from the lock means 90 and allow the shift plate 87 and head plate to withdraw with the energy of a revival spring.

In a re-advance of the head plate, the lock member 91 is unlocked by a plunger, for example. The power plate 84 is allowed to withdraw with the energy of a revival spring, and the roller 85 compressively moves along the cam 83 up to the smallest radius portion. The compression force of the roller 85 causes the intermittent gear 81 to slightly rotate together with the cam 83 so that one end portion of the series of teeth of the intermittent gear 81 engages the drive gear 80. This initial engagement between the intermittent gear 81 and drive gear 80 is hereinafter called "priming engagement". After the priming engagement is established, the rotation of the drive gear 80 is transmitted to the intermittent gear 81, cam 83, power plate 84 and shift plate 87 in this order, and the head plate is moved ahead.

In order to lock the power plate at a position ready for establishing the priming engagement which is indispensable for control of back and forth movement of the head plate, the prior art mechanism employs a specific lock member 91 controlled by a plunger.

The specific use of the lock member 91 increases the number of parts of the mechanism and hence invites a complicated structure and an increase of the assembling process. Additionally, the prior art arrangement requires two plungers for control of the head plate because the plunger for control of the shift plate holding means is deenergized upon withdrawal of the head plate, and a further plunger is used to unlock the power plate lock member.

OBJECT OF THE INVENTION

It is therefore an object of the invention to provide a power plate holding mechanism significantly simplified in construction, by using the shift plate not only for advance of the head plate but also as the power plate lock member, instead of using a separate lock member and control plunger.

SUMMARY OF THE INVENTION

In accordance with the present invention, there is provided a power plate holding mechanism in a tape player including a head movable back and forth together with a head plate, said power plate holding mechanism comprising:

a shift plate pivotably connected to the head plate;

a plunger preventing rotation of said shift plate during advance movement of the head plate;

a lock means adapted to lock said shift plate at its advance position;

a pull member provided on a power plate to pull said shift plate;

an engage portion formed on said shift plate to engage said pull member during advance movement of said power plate; and a power plate lock portion formed on said shift plate to engage said pull member while the power plate is locked.

BRIEF DESCRIPTION OF THE DRAWINGS

FIGS. 1 through 3 illustrate a power plate holding mechanism embodying the invention in which FIG. 1 is a plan view in the stop or pause mode, FIG. 2 is a plan view at the start of the play mode, and FIG. 3 is a plan view in the play or FF/REW mode.

DETAILED DESCRIPTION

Figure 1:
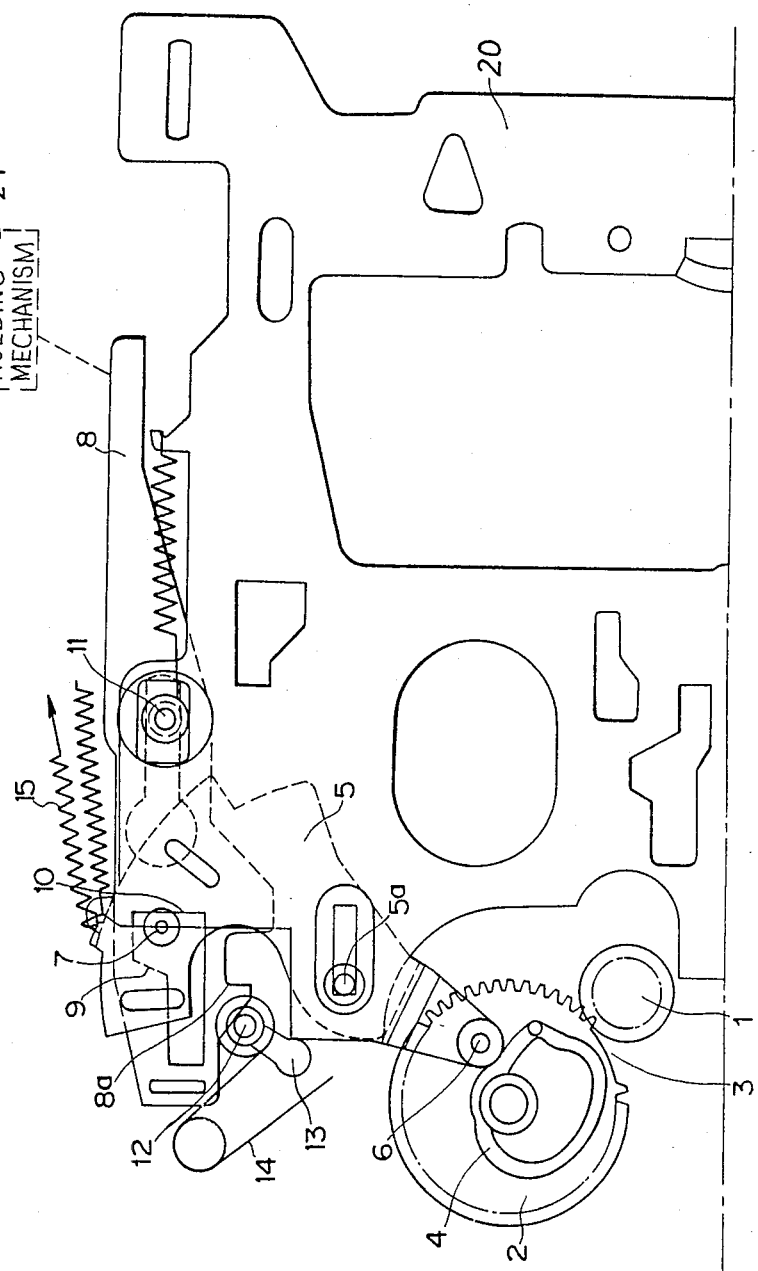

The invention is hereinbelow described in detail, referring to a preferred embodiment illustrated in the drawings.

As shown in FIG. 1, an intermittent gear 2 is provided adjacent a drive gear 1 continuously driven by a motor. The intermittent gear 2 has a cutout 3 partly breaking a series of gear teeth along the circumference thereof, and has a cam 4 integrally formed on one surface thereof. Near the intermittent gear 2 is mounted a power plate 5 rotatable about an axle 5a. The power plate 5 has one arm which supports a cam follower roller 6 contacting the outer margin of the cam 4 on the intermittent gear 2. Therefore, when the intermittent gear 2 is rotated by the drive gear 1, the power plate 5 is also rotated via the cam 4. The power plate 5 has another arm which is provided with a pin-shaped pull member 7 movable in a moderate arcuate orbit (substantially linearly) when the power plate 5 is rotated by the cam 4.

A shift plate 8 co-movable with a head plate is mounted for reciprocal movement along the orbit of the pull member 7 of the power plate 5. The shift plate 8 is provided with an L-shaped elongated hole one extension of which defines an advance-side (left in the drawings) angled edge 9 and a withdrawal-side (right in the drawings) edge 10 for engagement with the pull member 7 of the power plate 5. When the power plate 5 moves, the pull member 7 engages the angled edge 9 and pulls the shift plate 8. The shift plate 8 is mounted rotatable about a junction pin 11 connecting it to the head plate 20. However, it is controlled by a holding mechanism 2, so that it simply moves linearly and never rotates during advance of the head plate. Therefore, the angled edge 9 reliably receives a linear force from the pull member 7.

The shift plate 8 has a hook-shaped engage inlet 8a. A lock pin 12 movable in a guide hole 13 of a chassis of the tape player is always pushed by a spring 14 toward the shift plate 8. The shift plate 8 is locked when the lock pin 12 enters the inlet 8a of the shift plate 8 overmoved by an overstroke exceeding its lock position.

With this arrangement, the invention mechanism operates as follows.

In the stop mode shown in FIG. 1, the roller 6 of the power plate 5 is located at a small diameter portion of the cam 4 on the intermittent gear 2, and the intermittent gear 2 is maintained immovable at an angular position where the circumferential teeth thereof just enter in engagement with the drive gear 1.

Figure 2:
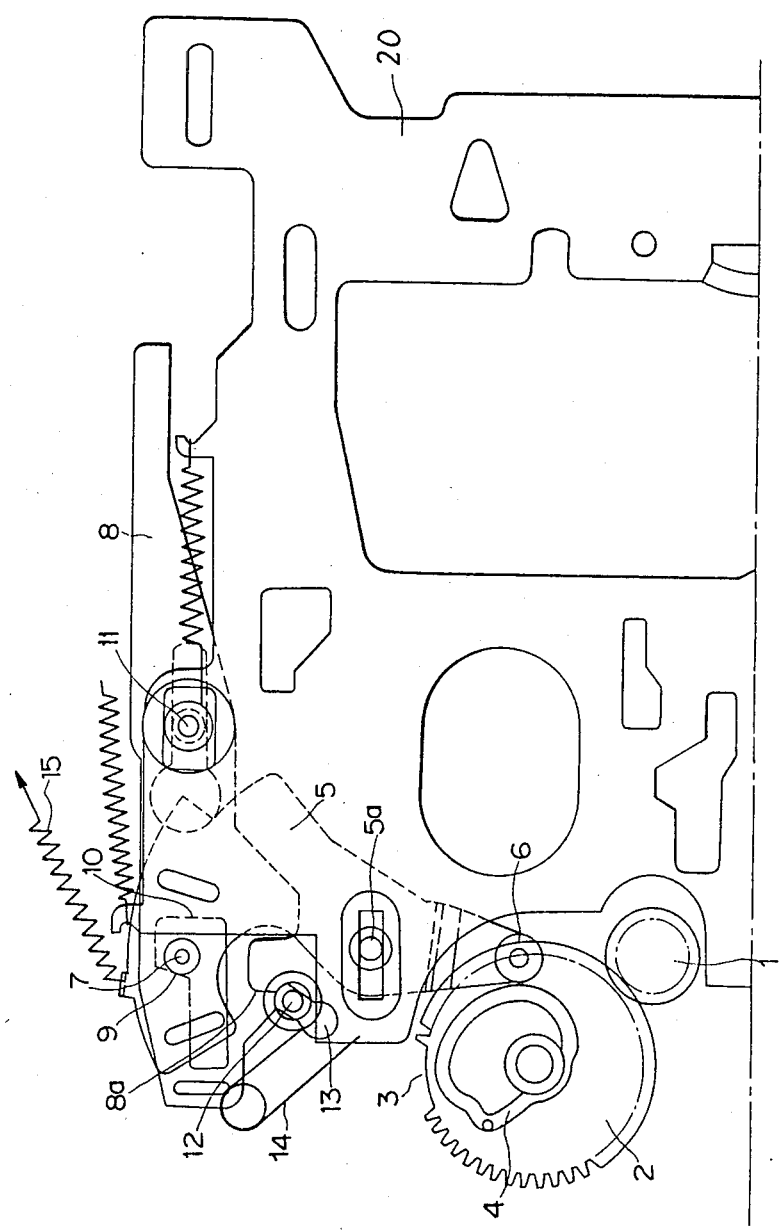

At the start of the play mode shown in FIG. 2, the intermittent gear 2 and cam 4 resume their rotation with energy of a motor not shown. The power plate 5 is rotated by the cam 4, and the pull member 7 of the power plate 5 pushes the angled edge 9 of the shift plate 8 to move the shift plate 8 and head plate 20 ahead (to the left). In this case, since the shift plate 8, although rotatable about the junction 11 with respect to the head plate, is prevented from rotation by the holding mechanism 2, during advance movement of the head plate, the angled edge 9 is reliably pushed by the pull member 7.

Figure 3:
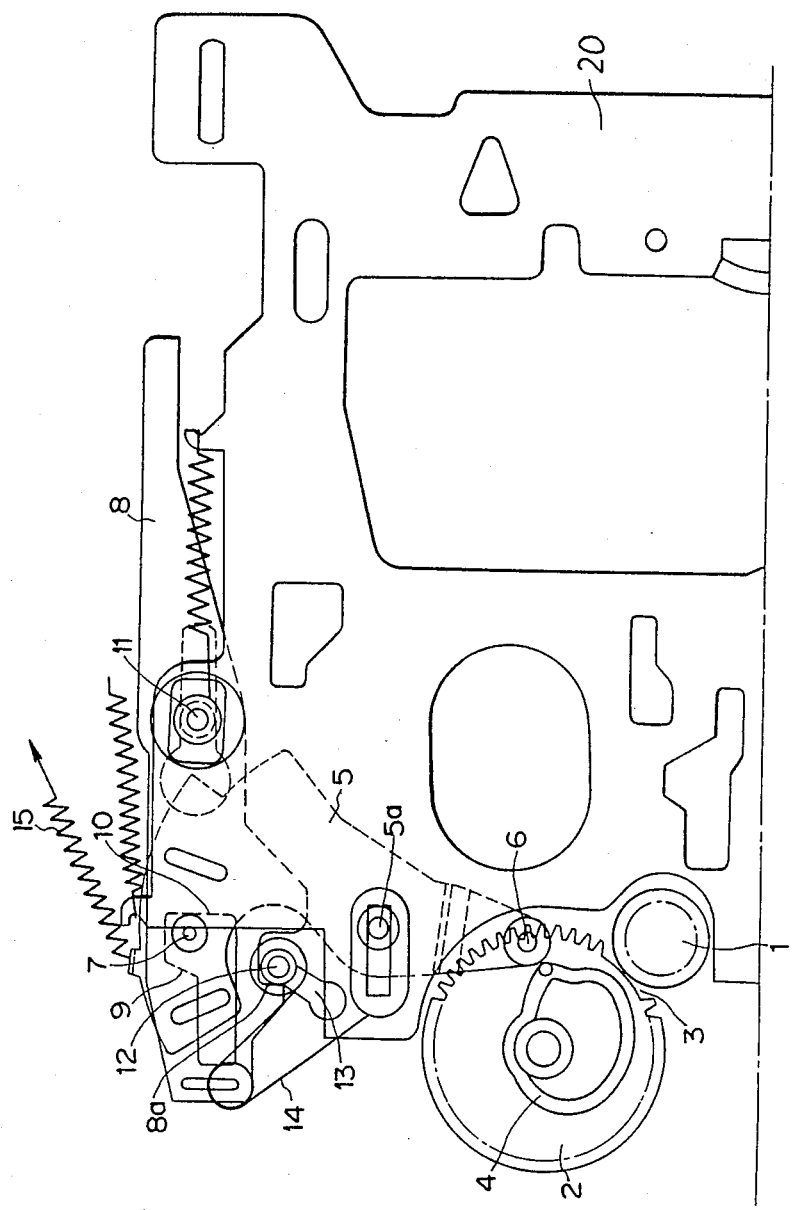

When the shift plate 8 reaches its advance position due to the pulling action of the power plate 5 as shown in FIG. 3, the lock pin 12 movable in the guide hole 13 of the chassis enters the inlet 8a of the shift plate 8 and locks same there. Since the intermittent gear 2 continues rotation after the lock pin 12 lockingly engages the inlet 8a, the shift plate 8 and power plate 6 start withdrawal as the cam 4 contacting the roller 6 reduces its diameter. Nevertheless, since the shift plate 8 is locked by the lock pin 12 at its advance (leftward) position, the head plate also stops at its advance (leftward) position where the play or FF/REW mode is established.

The power plate 5, however, continues withdrawal after the pull member 7 thereof has moved away from the angled edge 9 of the shift plate 8. With a slight withdrawal of the power plate 5, the cutout 3 of the intermittent gear 2 reaches the drive gear 1, and the intermittent gear 2 loses the driving energy. At that time, the roller 6 of the power plate 5 contacts the cam 4 at an angled portion slightly backward of the smallest radius portion. In this relationship, since the pull member 7 of the power plate 5 just contacts the withdrawal-side edge 10 of the shift plate 8, the power plate 5 is locked there regardless of the pulling energy of a withdrawal spring 15. Therefore, the cam 4 never receives any priming engagement force from the power plate 5, or in other words is not urged to rotate and the intermittent gear 2 is maintained disengaged from with the drive gear 1.

To establish withdrawal of the head plate for pause or ejection of the tape player, the holding mechanism 21 of the shift plate 8 is relesed by a plunger 22 thereof so that the shift plate 8 is allowed to rotate about the junction 11 in a direction to bring the engagement inlet 8a away from the lock pin 12. Thereby, the shift plate 208 and head plate withdraw with the energy of the revival spring. In this case, the force to rotate the shift plate 8 is produced by converting a linear pulling force of the withdrawal spring into a rotational force via the slope defined by the engagement inlet 8a.

Withdrawal of the shift plate 8 releases the pull member 7 from locking engagement with the withdrawal-side edge 10 of the shift plate 8 and hence releases the power plate 5. Therefore, the power plate 5 is rotated by the withdrawal spring 15, and the roller 6 pushes and rotates the cam 4 to give the intermittent gear 2 the priming rotation for entering it in engagement with the drive gear 1. In the pause or ejection mode, however, the intermittent gear 2 does not resume its subsequent rotation because the motor stops soon after deenergization of the plunger. Therefore, the head plate does not move ahead. An immediate advance of the head plate after a preceding withdrawal thereof for the FF/REW mode is established by deenergizing the plunger for a moment and continuing the rotation of the motor so that the intermittent gear 2 is rotated by the drive gear 1.

More specifically, re-advance of the head plate in the play or FF/REW mode is established by transmitting the rotation of the drive gear 1 from the intermittent gear 2 (now engaging the drive gear 1 due to the priming rotation) to the cam 4, power plate 5 and shift plate 8.

As described, since the invention mechanism is configured to lock the shift plate 8 pulled by the power plate 5 so that the locked shift plate 8 in turn limits the movement of the power plate 5 to keep same at a position ready for the priming rotation of the intermittent gear 2, it never fails to unlock the power plate 5 upon withdrawal of the shift plate 8 and never causes a malfunction due to insufficient or no priming rotation of the intermittent gear 2, regardless of its much more simplified construction.

Figure 4:
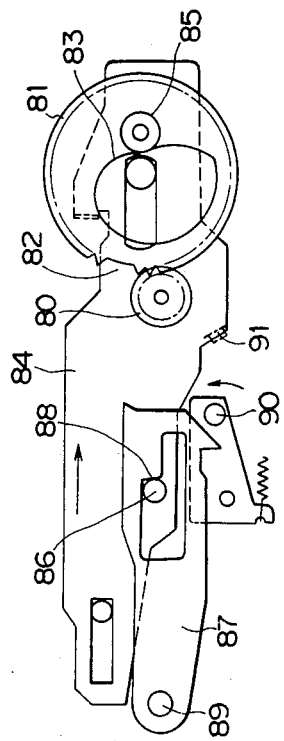
FIG. 4 is a plan view of a prior art power plate holding mechanism.

The invention is not limited to the tape player as illustrated, but may also be used in other various types such as the arrangement of FIG. 4 introduced as a prior art where the power plate is moved linearly, and an arrangement including a shift plate locking means similar to that of FIG. 4. Further, the engagement edges of the shift plate for engagement with the pull member 7 may be provided along side edges of the shift plate, and the shift plate may be linked to the head plate indirectly, i.e. via some other member.

As described, the power plate holding mechanism according to the invention is configured so that the shift plate to be pulled by the power plate, when locked, limits movement of the power plate and maintains it at a position ready for giving the intermittent gear a priming rotation. Additionally, the plunger for maintaining locking engagement of the shift plate is commonly used for locking control of the power plate. Therefore, the invention arrangement is simplified by omission of a separate lock member for the power plate and an additional plunger for control of the lock member which invited a complicated structure of the prior art mechanism. The simplified structure provides a reliable power plate holding mechanism much less liable to cause malfunction or misoperation.

The embodiment of the invention in which an exclusive property or privilege is claimed is defined as follows.

1. In a tape player which includes:
   a head plate supported for movement in a predetermined direction from a first position to a second position, and having thereon a magnetic head;
   a rotatable drive gear;
   a rotatable intermittent gear provided adjacent said drive gear, having a cutout portion interrupting a series of gear teeth provided along a circumference thereof, and having thereon a cam;
   a power plate supported for pivotal movement between first and second positions and having a portion engageable with said cam so that said cam effects movement of said power plate from its first position to its second position in response to rotation of said intermittent gear by said drive gear;
   a shift plate pivotally supported on said head plate, and holding means for releasably preventing pivotal movement of said shift plate relative to said head plate during movement of said shift plate and said head plate in said predetermined direction; and
   a spring which is cooperable with said power plate and applies thereto a bias force urging said power plate to pivot to its first position;
   the improvement comprising:
   a pull member which is provided on said power plate and moves approximately in said predetermined direction as said power plate moves from its first position to its second position;
   an engaging portion which is formed on said shift plate and is engaged by said pull member during movement of said pull member in said predetermined direction so that said pull member effects movement of said shift plate in said predetermined direction to a predetermined position;
   lock means for releasably locking said shift plate in said predetermined position after said shift plate has been moved thereto by said pull member due to rotation of said power plate;
   said power plate cooperating with said cam so that when said bias force is moving said power plate to its first position said power plate effects rotation of said cam and said intermittent gear from a position in which said cutout is angularly aligned with said drive gear to a position in which said intermittent gear is operatively engaged with said drive gear; and
   a power plate lock portion which is formed on said shift plate and engages said pull member when said shift plate is releasably held in said predetermined position so as to prevent movement of said power plate back to its first position under the urging of said spring.

2. A tape player comprising:
   a rotatably supported drive gear;
   an intermittent gear having a plurality of teeth along a circumference thereof, having a cutout interrupting said teeth, and having a cam;
   a shift member supported for movement parallel to a predetermined direction between first and second positions and having thereon an engage portion and a lock portion;
   selectively actuable lock means for releasably holding said shift member in its second position;
   a movably supported head member and means for effecting movement of said head member from one position to another position in response to movement of said shift member from its first position to its second position;
   a power member supported for movement between first and second positions, having thereon a cam follower portion engageable with said cam on said intermittent gear, and having thereon a pull portion which moves generally parallel to said predetermined direction as said power member moves between its first and second positions and which can engage said engage portion and said lock portion of said shift member; and
   resilient means for yieldably urging said power member toward its first position;
   wherein when said drive gear is engaging the teeth of said intermittent gear and rotates said intermittent gear from a first angular position to a second angular position, said cam on said intermittent gear moves said cam follower member on said power member in a manner effecting movement of said power member from its first position to its second position, said pull portion of said power member engaging said engage portion of said shift member and effecting movement of said shift member from its first position to its second position, said lock means releasably locking said shift member in its second position, and said lock portion on said shift member engaging said pull portion of said power member so as to releasably hold said power member in a position spaced from its first position;
   wherein as said drive gear rotates said intermittent gear from said second angular position to a third angular position said drive gear moves into angular alignment with said cutout in said intermittent gear; and
   wherein when said shift member is released by said lock means said resilient means effects movement of said power member back to its first position, said cam follower portion of said power member engaging said cam on said intermittent gear and effecting rotation of said intermittent gear from said third angular position to said first angular position as said power member is moved back to its first position.

3. The tape player of claim 2, wherein said shift member is supported on said head plate for pivotal movement about a pivot axis; wherein said engage portion of said shift member is inclined with respect to a line which extends radially from said pivot axis to said engage portion and which is approximately parallel to said predetermined direction; and wherein said lock means includes an engage inlet provided in said shift member at a location spaced radially from said pivot axis, a lock pin supported for movement toward and away from said engage inlet, spring means for yieldably urging said lock pin toward said engage inlet, and hold means for releasably preventing pivotal movement of said shift member in a direction causing said engage inlet to move away from said lock pin.

4. The tape player of claim 3, wherein said shift member is supported on said head member for reciprocal movement relative thereto in directions substantially parallel to said predetermined direction, and including a spring which yieldably urges said shift member to move opposite said predetermined direction relative to said head member.

5. The tape player of claim 4, wherein said movement of said power member is pivotal movement about a pivot axis, said cam follower portion and said pull portion being spaced radially from said pivot axis of said power member.

* * * * *